Figure 1:
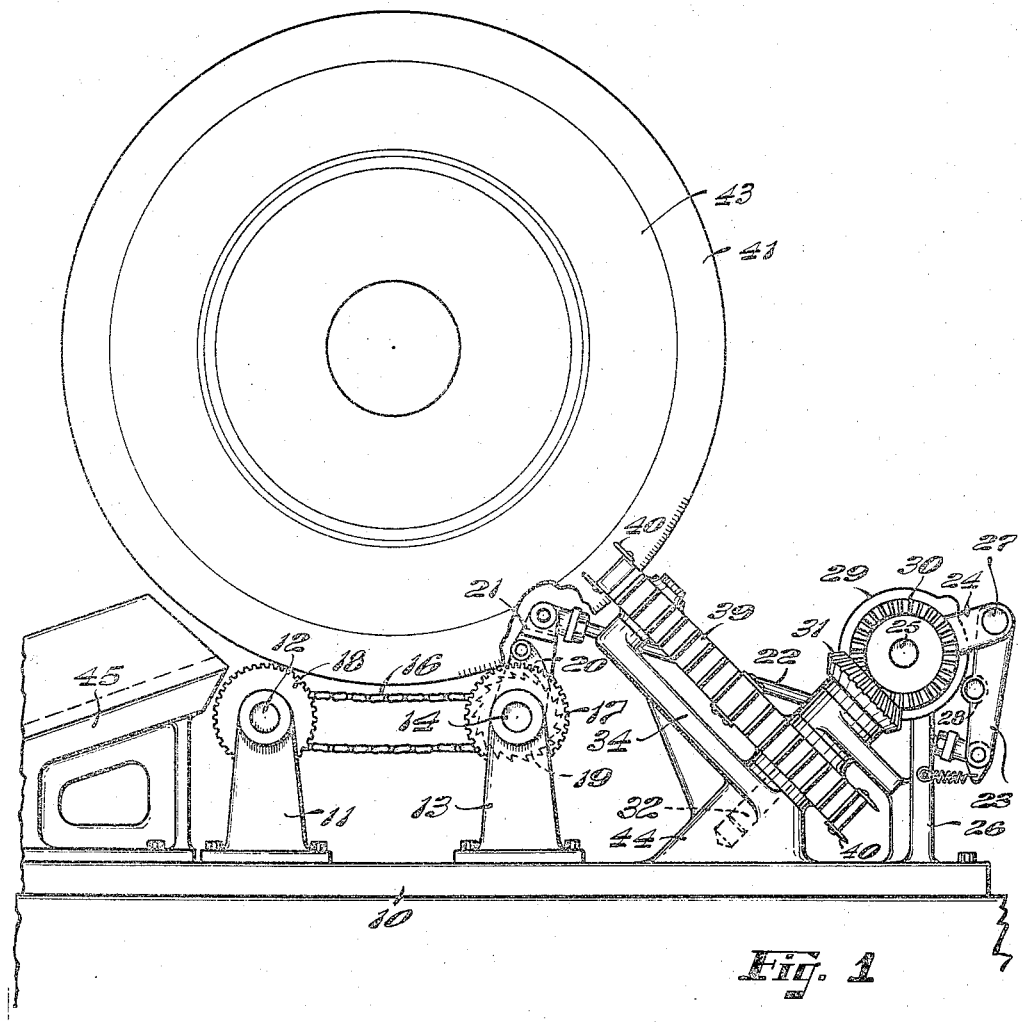

Feb. 9, 1960 F. C. MESERVE ET AL 2,924,267
MACHINE FOR SLITTING TIRES
Filed March 29, 1954 3 Sheets-Sheet 1

INVENTORS
F. Clayton Meserve &
Minot K. Smith.
by Kenway, Jenney, Witter & Hildreth,
Attys.

Feb. 9, 1960 F. C. MESERVE ET AL 2,924,267
MACHINE FOR SLITTING TIRES
Filed March 29, 1954 3 Sheets-Sheet 2

INVENTORS
F. Clayton Meserve
Minor F. Smith

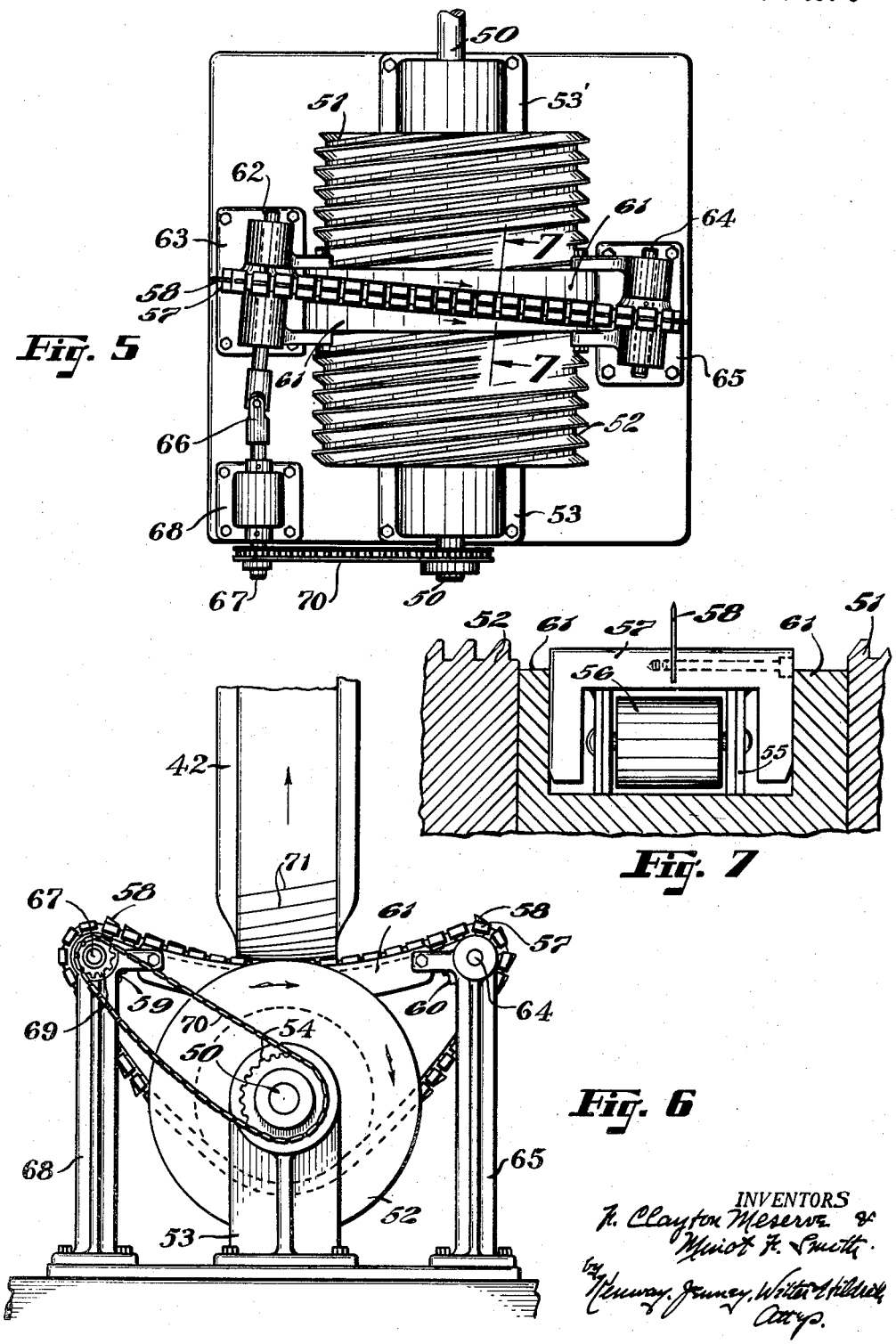

United States Patent Office 2,924,267
Patented Feb. 9, 1960

2,924,267

MACHINE FOR SLITTING TIRES

Forrest Clayton Meserve, Andover, and Minot F. Smith, Wellesley, Mass., assignors to Micro Machinery Products, Inc., Winchester, Mass., a corporation of Massachusetts Application March 29, 1954, Serial No. 419,144

3 Claims. (Cl. 157—13)

This invention comprises a novel machine employing a continuously running knife for cutting or slicing tires, operations being carried out either while the tire remains in place on the wheel of the vehicle or while independently supported.

It has been found beneficial in the treads of pneumatic tires to provide closely spaced transverse slits which function to provide the tire with certain desirable anti-skid properties in use and which augment the braking effect and so increase in general the safety of driving. The depth to which the surface slits may be extended into the tread of a new tire by existing means is limited to about ¼ inch but it has been found desirable to form deeper slits in many cases and also to supply additional transverse slits to worn tire treads in order to restore them to their original effective condition after they have been worn down in use.

An object of the present invention is to provide a tire cutting machine so constructed and arranged that tire treads may be deeply and uniformly slitted without removing the tire or the wheel from the vehicle. In this connection, accordingly, an important feature of our invention comprises spaced rolls or other rotatable means for supporting a vehicle wheel off the ground in position where it may be rotated for cutting, in combination with a chain type of slitting mechanism arranged to operate on the tire while so supported.

Another important feature of our invention comprises a continuously running blade-carrying chain. Such a chain may advantageously be assembled and operated with means for intermittently rotating the tire, or by guiding the blade-carrying chain in a path inclined to the axis of rotation of the tire, the tire may be rotated continously during the slitting operation. In the latter case the slits will be formed at a slight transverse angle, that is to say, they will not be parallel to the axis of rotation of the tire. It has been found, however, that such variation in the angle of the slits is in no way undesirable or at all detrimental to the desired results and that it substantially expedites the whole operation. In one aspect, therefore, the invention comprises a process of slitting pneumatic tires which is characterized by the steps of rotating the tire and passing a chain-carried slitting knife through the tread thereof in a path at an inclination to its axis of rotation while the tire is in motion.

Going more into detail, our invention includes as an important feature an endless chain mounted to travel over sprocket wheels located on opposite sides of the plane of rotation of the tire and guided in a path transversely beneath the tire. This carrier chain is equipped with spaced series of slitting blades that increase progressively in effective height so that each cut is made in a shearing manner and the formation of closely spaced clean-cut slits is thus facilitated.

Figure 2:
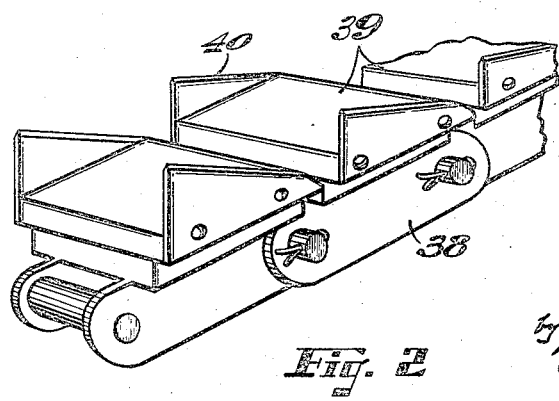
Figure 3:
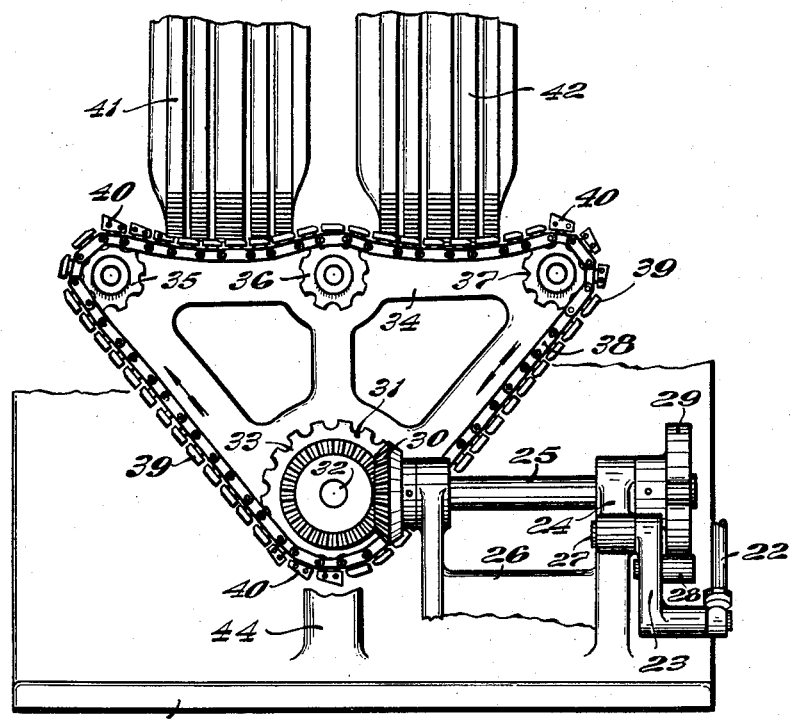
Figure 4:
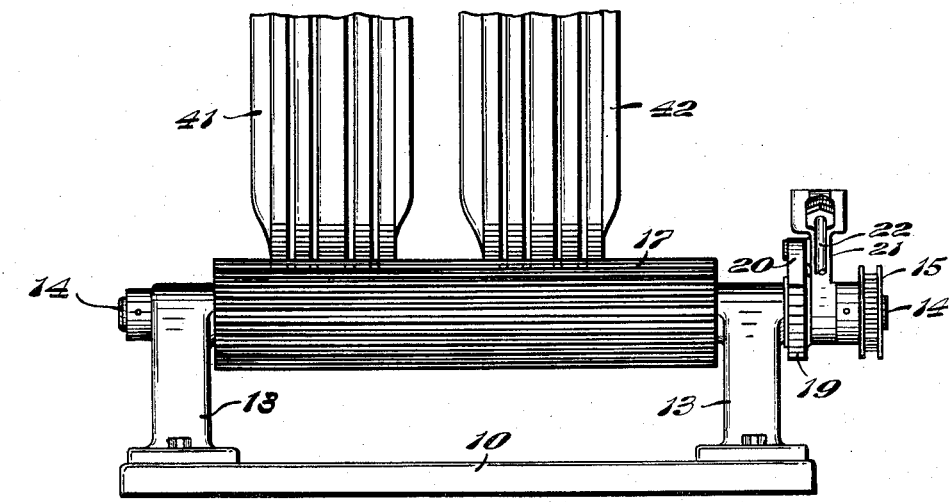

These and other features of the invention will be best understood and appreciated from the following description of preferred embodiments thereof selected for purposes of illustration and shown in the accompanying drawings in which:

Fig. 1 is a view of the machine in elevation showing a tire in operative position for slitting, Fig. 2 is a fragmentary view in perspective of the blade-carrying chain, Fig. 3 is a view in elevation at right angles to that of Fig. 1, Fig. 4 is a view in elevation with parts removed to disclose the tire feeding roll 17, Fig. 5 is a plan view of a machine embodying the invention in a modified form, Fig. 6 is a corresponding view in end elevation, and Fig. 7 is a fragmentary sectional view on the line 7—7 of Fig. 5 and on an enlarged scale.

The machine shown in Figs. 1–4 comprises a base 10 to which are bolted a pair of upstanding bearing brackets 11 for a transverse shaft 12 and a spaced pair of upstanding bearing brackets 13 for a transverse shaft 14. The shaft 14 carries at its inner end as shown in Fig. 4 a sprocket wheel 15 over which runs an endless sprocket chain 16 geared to a similar sprocket wheel (not shown) on the inner end of the shaft 12. The shaft 14 carries a fluted tire supporting roll 17 and the shaft 12 carries a corresponding fluted roll 18. These two rolls collectively provide a cradle for rotatably supporting a tire and they are geared together through the medium of the sprocket chain 16 so that they can rotate only at the same speed.

The shaft 14 has a ratchet wheel 19 fast to it adjacent to the inner bearing bracket 13 and with the ratchet wheel operates a pawl 20 pivotally mounted upon an oscillatory arm 21. The arm 21 is connected through a rod 22 to a depending cam arm 23 pivotally mounted at its upper end by a pin 27 on a stationary bracket 24. This bracket is secured to a bearing bracket 26 projecting upwardly from the base and in it is journaled a third transverse shaft 25. The shaft 25 has fast upon its rear end a cam 29 having a single throw in its periphery and cooperating with a cam roll 28 carried by the cam arm 23. In each revolution of the shaft 25, therefore, the cam arm 23 is given one complete oscillation and the ratchet wheel 19 advanced a corresponding distance, for example, two teeth at a time, this being sufficient to impart a rotary movement of about 0.077" to the tire.

At its front end the shaft 25 carries a bevel gear 30 meshing with a corresponding bevel gear 31 on the upper end of a shaft 32 journaled in a bearing bracket 44 which projects upwardly and at an outward inclination from the base 10. The shaft 32 also carries a sprocket wheel 33 and the bracket 44 carries a triangular frame 34 which is disposed in substantially radial relation to the tire being slit. The frame 34 carries at its upper portion sprocket wheels 35, 36 and 37 over which, and the sprocket wheel 33, a sprocket chain 38 runs in a triangular path. The chain as shown in Fig. 2 carries on each link a block 39 to the opposite edges of which are secured slashing blades 40. As shown in Fig. 3 the chain is driven in a clock-wise direction.

The slashing blades 40 are arranged in several series spaced from each other to provide a brief tire-feeding interval between the cutting of successive slits. The blades of each series progressively increase in effective height so that each slit is formed in a slashing or drawing manner, a procedure that has been found particularly effective when it is desired to form the slits with a close uniform spacing. The blades may be secured in procession all to one edge of the blocks 39 or to both edges. In the latter case two slits will be formed at once and the length of the tire feeding steps correspondingly increased.

As shown in Fig. 3 the upper sprocket wheels 35, 36 and 37 are so located as to guide the chain 38 in a curved path conforming to the transverse contour of tires 41 and 42 such as would be found on the duplex wheels of a truck, but it will be understood that the path of the chain may be adjusted for any desired contour by adjusting the position of the guiding sprocket wheels. The several groups or series of slitting blades 40 are disposed in spaced relation upon the chain 38; for example, as herein shown fifteen blank blocks occur between each series of three or six blades. This spacing of the slitting blades is such that the step of rotating the tires may be effected in the interval between the emergence of one series of blades or pair of series from the tread of the tire and the entrance of the next following series or pair of series of blades. The frame 34 is provided with an open channel in which the blocks 39 of the chain are confined and guided in their travel beneath the tires.

The machine is preferably provided with a ramp 45 by which the wheel or wheels 43 having the tires 41 and 42 to be slit may be easily rolled up into supported position upon the rolls 17 and 18. If it is desired to slit the tires on unmounted wheels, the wheels may be merely lifted into position and supported for rotation by any convenient means.

The shaft 25 constitutes a common actuator for the blade-carrying chain and the tire rotating ratchet mechanism and may be driven at a uniform speed from any convenient source of power. When so operated it will be understood that while the pawl 21 is at rest or making its idle stroke, one series of slitting blades 40 on the chain 38 will be drawn through the treads of the tires. Then as these blades emerge the pawl 20 will make its operative stroke and the tire will be advanced into position for the next pair of slitting blades. Two slits may be made at each operation with double the spacing of the slits as eventually formed about the whole circumference of the tire tread, the blades so spaced on the blocks 39 as to give any desired spacing of the slits.

The driving tension in the chain 38 tends to hold the top pass of the chain against both tires while they are being cut. The chain is guided against lateral displacement by the guide channel in the frame 34 so that it cannot be drawn out of line by the friction of the tire tread as the tire is rotated. The guide channel has no constraining effect on the chain in preventing it from conforming to the transverse contour of the tread.

In a modified construction of our invention, as shown in Figs. 5 to 7, we employ a threaded drum or cylinder for the tire-feeding function. As shown in these figures, a horizontal shaft 50 mounted in bearing brackets 53 and 53' carries threaded drum sections 51 and 52. These sections may be part of a single drum and separated by a circumferential recess, or they may be formed separately and keyed to the shaft. At its front end, the shaft carries a sprocket wheel 54 and at its rear end, it may be extended for any convenient driving connections (not shown). The drum is herein shown as having a helical right-hand thread and driven in clockwise direction as seen in Fig. 6, and so rotating the tire upwardly in the side toward the observer. The same result would be secured by employing a drum with a left-hand thread and rotating it counter-clockwise.

The tire slitting means herein shown comprises a chain 55 having rolls 56 that mesh with sprocket wheels 59 and 60. To each link of the chain is secured a flat topped forked block 57 and upstanding slitting blades 58 are secured to these blocks in spaced series and graduated effective height as described in connection with Fig. 3.

The sprocket wheel 59 is mounted on a shaft 62 journaled in the upper end of a bearing bracket 63 and disposed at an inclination to the axis of the shaft 50 opposite to the pitch angle of the threads on the drum sections 51 and 52. In practice, these sections may be 5" in pitch diameter and provided with right-hand worm threads, 13 to the inch, modified in contour so that they have an effective driving bite on the tire being slitted at both sides of the circumferential recess of the drum.

A curved bar 61 is supported at its opposite ends by the brackets 63 and 65 and extends transversely through the recess between the drum sections 51 and 52. It is provided in its upper concave face with a guide track for the chain 55 and this track extends at an opposite angle to the direction of the worm threads of the drum sections. It supports the chain for movement in an oblique concave path corresponding transversely to the contour of the tire 42, with the slitting knives projecting above the threads by the depth of the desired slitting.

The shaft 62 is connected through a universal joint 66 to a shaft 67 journaled in the upper end of the bearing bracket 68 and this shaft carries at its outer end a sprocket wheel 69 over which runs a sprocket chain 70 connecting it to the sprocket wheel 54 on the driving shaft 50.

In operation the tire 42 to be slitted is placed in position to rest symmetrically on the drum sections 51 and 52 spanning the recess between them and in this position the tire may be either mounted on the truck or vehicle wheel or provided with other supporting means. When the shaft 50 is driven, the worm threads indent and rotate the tire continuously in worm and wheel fashion and at a uniform rate in the direction of the arrow in Fig. 6. At the same time, the chain 55 with its slitting blades 58 is driven from left to right and the blades from the slits 71 as indicated in Fig. 6, these being inclined at an acute angle of about 8° to the axis of the tire. The spacing of the blades on the chain is such as to give each series of blades time to perform its slitting operation and this is followed by interval of no slitting while the blank blocks 57 pass beneath the tire and the tire itself is rotated to bring its tread into position for the next slit. It will be understood that the spacing of the blades 58 and the speed of the chain is synchronized with the rotational movement of the tire effected by the threaded sections 51 and 52. The greater the interval between the consecutive blade series, the greater will be the distance between adjacent slits 71 in the tire, and this may be regulated to unit the requirements of the work in hand. The speed of the chain is preferably such that the leading blade is carried forward in the tire a distance corresponding to the pitch of the thread as the blade passes from one edge of the thread to the other.

Having thus disclosed our invention and described in detail an illustrative embodiment thereof, we claim as new and desire to secure by Letters Patent:

1. A tire cutting machine comprising means for supporting and rotating a tire, in combination with a carrier chain guided in a path transverse to the tire, and several series of slitting knives mounted permanently in longitudinal procession on the chain and projecting therefrom, each series being separated by an interval and the knives of each series progressively increasing in effective height, the lower height portions of the knives being set to enter the tire first and the knives thus cutting progressively deeper as they pass through the tread of the tire and so operating to make a slicing cut.

2. A tire slitting machine comprising a continuously rotated drum having tire-indenting threads and an intermediate circumferential recess interrupting the threads, means for supporting a tire for rotation about an axis at right angles to that of the drum and in position to be indented by said threads on both sides of the recess and to be rotated by the threads, a carrier chain passing through the recess in a path inclined to the axis of the drum, and slitting blades attached to the chain and projecting beyond the threads of the drum, thereby slitting the tire in an area between its points of engagement with said threads.

3. A tire slitting machine as described in claim 2, further characterized in that a curved track extends transversely through the said recess of the drum and the chain is guided and supported by this track while slitting the tire.

References Cited in the file of this patent

UNITED STATES PATENTS

| | | |
|---|---|---|
| 1,730,585 | Midgley | Oct. 8, 1929 |
| 1,737,146 | Castricum | Nov. 26, 1929 |
| 1,771,722 | Prentice | July 29, 1930 |
| 1,894,347 | Dacon et al. | Jan. 17, 1933 |
| 2,015,635 | Errig et al. | Sept. 24, 1935 |
| 2,048,947 | Piquerez | July 28, 1936 |
| 2,105,316 | Fleming | Jan. 11, 1938 |
| 2,192,130 | Errig et al. | Feb. 27, 1940 |
| 2,575,450 | Huff | Nov. 20, 1951 |
| 2,698,034 | Jakku | Dec. 28, 1954 |
| 2,717,639 | James | Sept. 13, 1955 |
| 2,741,307 | Meserve et al. | Apr. 10, 1956 |

FOREIGN PATENTS

| | | |
|---|---|---|
| 6,259 | Great Britain | 1912 |
| 127,147 | Austria | Mar. 10, 1932 |
| 376,539 | Germany | May 31, 1922 |